Nov. 14, 1939. H. A. SMITH 2,179,761
ELECTRIC APPLIANCE STRUCTURE
Filed May 9, 1938
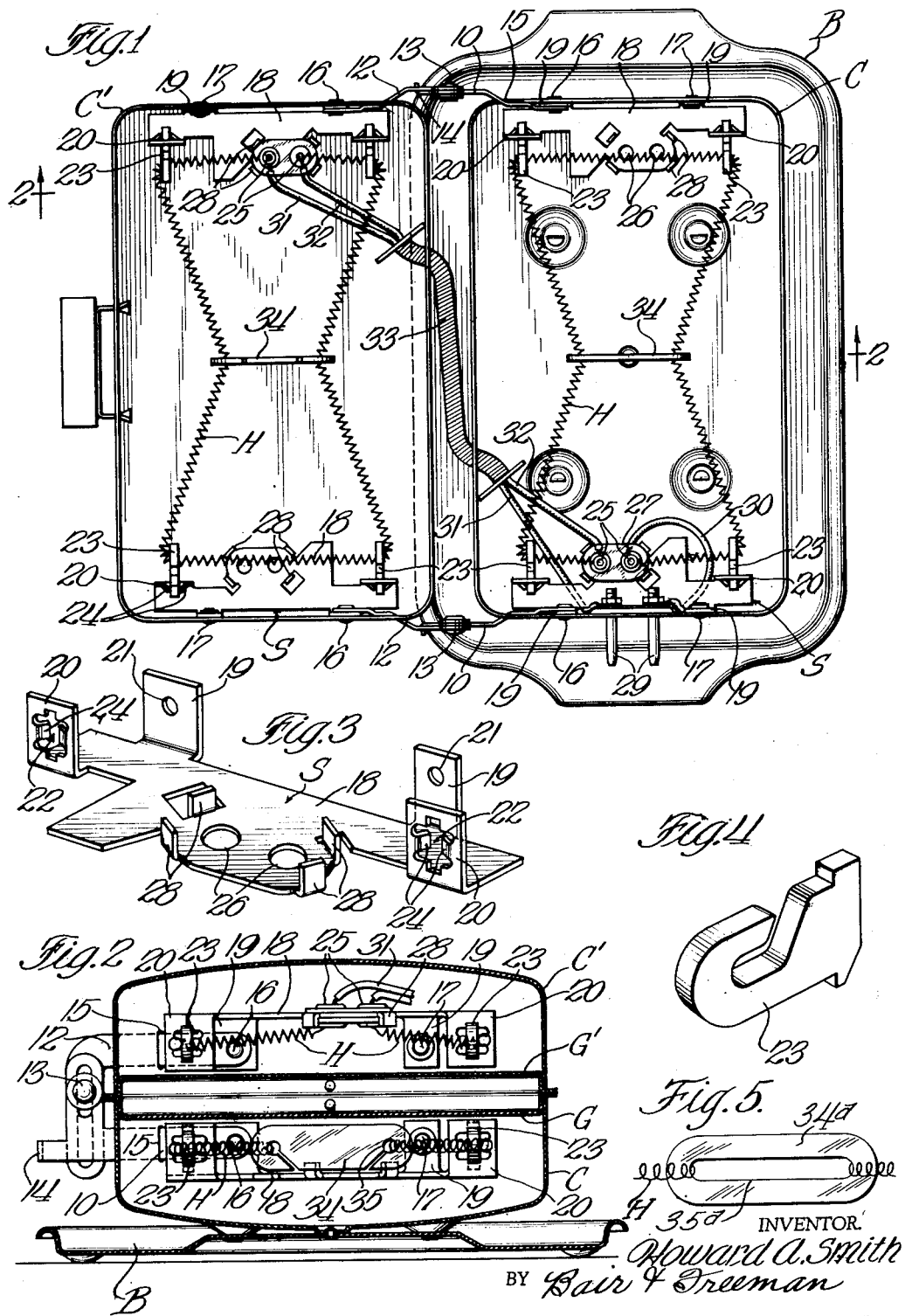
INVENTOR.
Howard A. Smith
BY Bair & Freeman
ATTORNEYS Patented Nov. 14, 1939

2,179,761

UNITED STATES PATENT OFFICE 2,179,761

ELECTRIC APPLIANCE STRUCTURE

Howard A. Smith, St. Louis, Mo., assignor to Knapp-Monarch Company, St. Louis, Mo., a corporation of Missouri Application May 9, 1938, Serial No. 206,809

6 Claims. (Cl. 219—19)

An object of my invention is to provide an electrical appliance structure having parts so designed and related that the structure can be manufactured inexpensively and assembled at a minimum of cost.

Another object is to provide an electrical appliance such as a sandwich toaster including a casing with an inexpensive but efficient heating element, there being a minimum of insulator supports required for the heating element and novel means being provided in connection with the heating element for causing the element to assume a predetermined desired shape and prevent sagging of the element against the wall of the casing when it is heated.

Still another object is to provide sheet metal stampings which can be secured as by riveting to the opposite ends of the casing and which in turn support inexpensive insulating elements which are readily assembled relative to the sheet metal stampings by merely slipping them through perforations therein, tongues being formed adjacent these perforations to retain the insulating elements in a desired angular relation to the stampings.

A further object is to provide a heating element threaded through insulators at the corners of the casing and to provide a strip of insulating material through which the intermediate portion of the heating element between the stampings is threaded, such strip of material being thereby held edgewise relative to the bottom of the casing and grid of the structure so as to effectively prevent sagging of the heating element against any metallic part of the structure.

Still another object is to provide an inexpensive hinge structure which can be readily assembled and rigidly fixed relative to the casing members of a sandwich toaster or the like by the use of a single rivet for each part of each hinge.

With these and other objects in view, my invention consists in the construction, arrangement and combination of the various parts of my appliance and heating means, whereby the objects contemplated are attained, as hereinafter more fully set forth, pointed out in my claims, and illustrated in the accompanying drawing, in which:

Figure 1 is a plan view of a sandwich toaster embodying my invention and showing the grids removed for illustrating the internal construction of the toaster.

Figure 2 is a sectional view on an enlarged scale on the line 2—2 of Figure 1 showing the grids in position and the toaster closed.

Figure 3 is an enlarged perspective view of a stamping which I use in my structure for supporting the heating element.

Figure 4 is an enlarged perspective view of an insulating element used for supporting the heating element of the structure; and Figure 5 is a front elevation of a modified heating element support which can be used in my structure.

On the accompanying drawing I have used the reference character B to indicate generally a tray-like base for my appliance. Secured to the base B is a lower casing member C to which is hinged an upper casing member C'. Sheet metal grids G and G' close the open faces of the casings C and C' as shown in Figure 2.

The casings C and C' are hinged together by hinge members 10 and 12. The hinge members are pivoted together as by rivets 13 extending through slots of the hinge members so that the grid members G and G' can be spaced apart different distances for different thicknesses of sandwiches. The hinge members 10 are provided with stop lugs 14 with which the hinge members 12 are adapted to engage when the structure is opened as in Figure 1 whereupon each of the grids can be used as a grill.

The hinge members 10 and 12 are secured to the casings C and C' in a novel manner. The end walls of the casings are provided with perforations 15 which are slots shaped to conform to the cross sectional shape of the hinge elements 10 and 12. The hinge elements are assembled by extending them through the perforations 15 and then riveting them as at 16 to the end walls of the casings C and C'. Thus each hinge member is fixed relative to the casing by a single rivet and any possibility of pivotal movement about this rivet is entirely eliminated. This obviously makes an inexpensive yet satisfactory construction.

Sheet metal stampings S are secured to each end wall of each casing by the rivet 16 and by additional rivets 17. Each stamping S comprises a substantially horizontal flange 18 and vertical flanges 19 and 20 at opposite sides thereof. The flanges 19 are perforated as at 21 to receive the rivets 16 and 17 while the flanges 20 are perforated as at 22 to receive insulator elements 23. Adjacent the perforations 22, each flange 20 is provided with lugs 24 bent at an angle to the plane of the flange and engageable with the sides of the insulator 23 as shown in Figure 1 to retain the insulator at a predetermined angle relative to the flange.

A heating element H, preferably a coiled resistance wire, is threaded through the four insulator elements 23 of each casing C and C'. Their terminal ends are secured to terminals such as rivets or the like 25 which extend through enlarged openings 26 of the flange 18 of the stamping S. Elongated strips 27 of insulating material such as mica or the like are positioned on opposite sides of the flange 18 as shown in the upper portion of Figure 2 and these are retained in their proper position by fingers 28 struck up from the flange 18. The insulators 27 retain the terminal rivets 25 centered relative to the enlarged openings 26 to prevent electrical contact therewith.

One end of the casing members is provided with suitable terminal prongs 29 to be received in the plug of a current supply cord in the usual manner. These are wired by wires 30 and 31 to two of the terminals 25 and a wire 32 connects the other two terminals together as shown in Figure 1. The wires 31 and 32 extend through a coil spring or the like 33 adjacent the hinge axis of the casings which coil spring acts as a protector for the wires.

I provide a novel means for preventing any possibility of the heating elements H sagging against the grids or the casings. This consists of an insulator or connecting element 34 for each of the heating elements H. The connecting elements 34 are of sheet insulating material such as mica and have openings 35 through which the heating elements are threaded. The elements 34 are thereby held edgewise relative to the bottoms of the casings C and C' and the grids G and G' which close the casings. Whenever the heating elements are energized, thus tending to cause them to stretch, the elements 34 prevent sagging of the heating elements to such an extent that they would engage the casings or grids and thus become grounded or short circuited.

I have provided a structure in which the heating element is very inexpensive as all four of the stampings S can be identical with two of them having the terminals 25 omitted therefrom. The connector elements 34 serve the double purpose of preventing the heating elements from sagging to an undesirable extent and serve to bow opposite sides of the heating element toward the center of the grid thus tending to distribute the heat more evenly as it is radiated from the heating element to the grid. The stampings S and the hinge members 10 and 12 are secured to the casings C and C' with a minimum of rivets or other securing means being necessary.

In Figure 5 I illustrate a modification of the connector element 34. It is indicated at 34a and has a slot 35a to receive the heating element H instead of the hook-like openings 35.

Some changes may be made in the construction and arrangement of the parts of my appliance without departing from the real spirit and purpose of my invention. It is therefore my intention to cover by my claims such modified forms of structure or use of mechanical equivalents, as may be reasonably included within their scope.

I claim as my invention:

1. In an electric appliance structure, a casing a grid therefor, means for heating said grid comprising insulators supported by said casing, a resistance element supported at points throughout the length thereof by said insulators and a connector between spaced stretches of said heating element, said connector being of insulating material being supported by said resistance element, bowing said stretches toward each other, and being maintained in position longitudinally of said stretches by the bowed conformation thereof.

2. In an electrical appliance, a casing, a grid therefor, means for heating said grid comprising insulators supported adjacent the corners of said casing, a resistance element supported at spaced points throughout its length by said insulators and a connector between opposite stretches of said heating element, said connector being of insulating material and bowing said stretches toward the center of said grid, said connector comprising a sheet of insulating material having a slot opening therein through which said opposite stretches of said resistance element extend, the bowed condition of said stretches causing them to engage opposite ends of said slot opening, said sheet of insulating material being thereby supported edgewise between said grid and the opposite wall of said casing and maintained in position longitudinally of said stretches.

3. In an electric appliance structure, a shallow pan-like casing, sheet metal stampings supported therein adjacent opposite walls thereof, insulators supported by said stampings, a heating element threaded through said insulators, and a connector element of insulating material from a stretch of said heating element along one side of said casing to the stretch of said heating element along the opposite side of said casing, said connector element being supported edgewise relative to the bottom of said casing and bowing said stretches toward the longitudinal center line of said casing and a grid member closing the top of said casing.

4. In an electric appliance structure, a casing, sheet metal stampings supported therein, insulators supported by said stampings, a heating element threaded through said insulators, the terminal ends thereof being supported by one of said stampings, means for insulating said terminal ends relative thereto, a connector element of insulating material from one stretch of said heating element to another stretch thereof, said heating element passing through a longitudinally extending slot in said connector element and a grid member closing the top of said casing, said connector element being supported by said heating element and extending beyond the upper and lowermost surfaces thereof for preventing contact of said heating element with said casing and grid.

5. In an appliance of the character disclosed, a shallow pan-like casing, a grid for closing the open face thereof, a heating element within said casing and supported adjacent the corners thereof, said heating element comprising a coiled resistance element and means for supporting the intermediate portion of said coiled resistance element comprising an insulating strip, opposite stretches of said heating element being threaded therethrough and bowed toward each other under tension, whereby said insulating strip is supported by said opposite stretches edgewise relative to the bottom of said casing and to said grid.

6. In a device of the class described, a casing, a heating element in said casing and means for supporting said heating element including a bracket at each end in said casing, each bracket having a web portion, a pair of mounting lugs at one edge of said web extending at right angles thereto, said mounting lugs being riveted to a wall of said casing, a pair of insulator-supporting lugs at the opposite edge of said web and at the ends thereof, said supporting lugs having irregularly shaped perforations adapted to receive and retain insulator members, and insulator members received in said perforations, said insulator members being formed of sheet insulation, having a hook portion at one end adapted to pass through said perforations and to receive said heating element, and having a broad portion at the opposite end, said broad portion being greater in width than said perforations.

HOWARD A. SMITH.